May 12, 1925.
C. FOWLER
FREIGHT CAR
Filed July 15, 1922
1,537,162
2 Sheets-Sheet 1
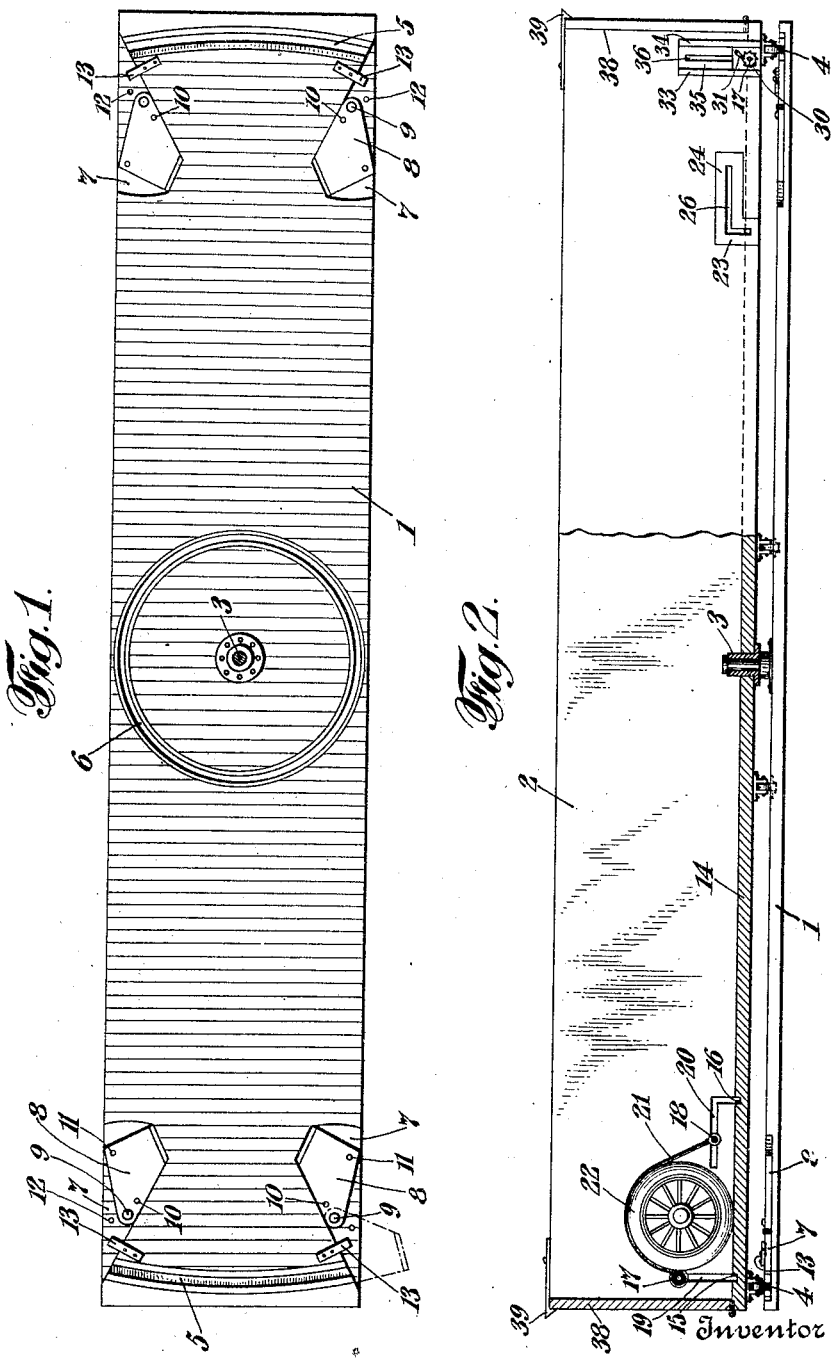

May 12, 1925. 1,537,162
C. FOWLER
FREIGHT CAR
Filed July 15, 1922 2 Sheets-Sheet 2
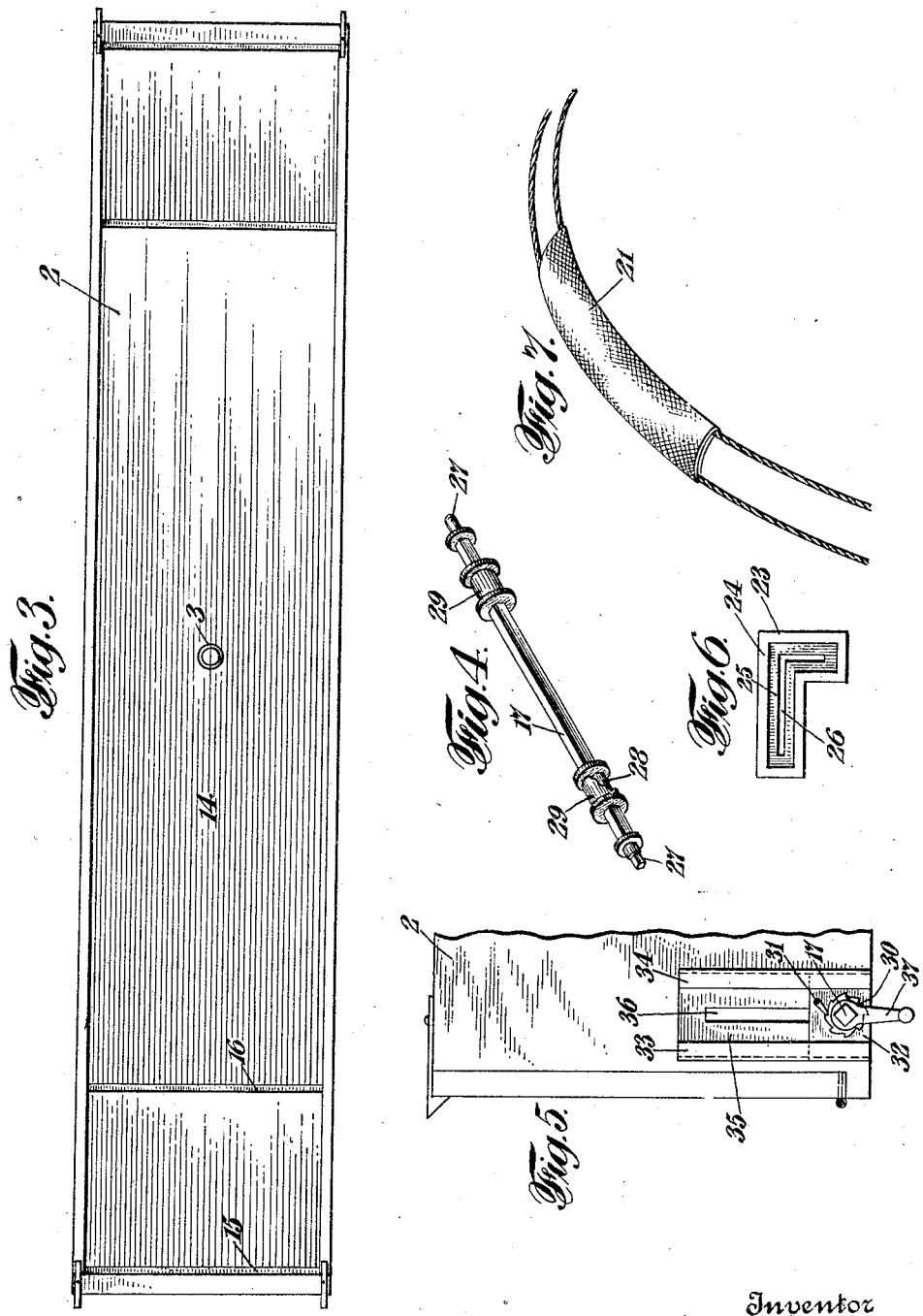
Inventor
Charles Fowler
By his Attorneys
Prindle, Wright, & Small.

Patented May 12, 1925.

1,537,162

UNITED STATES PATENT OFFICE.

CHARLES FOWLER, OF BEVERLY FARMS, MASSACHUSETTS.

FREIGHT CAR.

Application filed July 15, 1922. Serial No. 575,301.

*To all whom it may concern:*

Be it known that I, CHARLES FOWLER, a citizen of the United States, a resident of Beverly Farms, in the county of Essex and State of Massachusetts, have invented certain new and useful Improvements in Freight Cars, of which the following is a specification.

This invention relates to freight cars which are provided with turn-tables for the purpose of loading and unloading vehicles of various kinds from and onto suitable platforms adjacent the cars.

The invention in one of its embodiments is illustrated in the accompanying drawings which form part of this specification, and in said drawings, Fig. 1 represents a floor of a car such as a freight car, which is provided with tracks to support a turn-table;

Fig. 2 represents an elevation partly in section of a portion of a car with a turn-table mounted thereon;

Fig. 3 is a plan view of the floor of the turn-table;

Fig. 4 is a view of a locking bar used to tighten locking bands around the wheels of vehicles stationed within the car;

Fig. 5 is a view of an end portion of the car showing a means for tightening and rotating the locking bar;

Fig. 6 is a view of a plate adapted to be fastened to a side of the car, and

Fig. 7 is a perspective view of a locking band.

In said drawings there is shown a floor 1 of a freight car such as a flat car, and above this floor is mounted a turn-table 2 for rotation upon a pivot pin 3. The said floor 1 may be formed by building it directly upon the long steel girders running the length of the car from one running gear to the other. Wheels 4 are mounted on the under side of said turn-table for travel in outer tracks 5 and inner track 6, both on the floor 1 of the car, and these tracks may be countersunk to the level of the floor or raised above it as desired. The floor has recesses 7 at each corner thereof as shown in Fig. 1, and in these recesses are provided plates 8 lying flush with the top of the floor 1 and positioned to turn about pivots 9. These plates 8 may be moved outwardly beyond the floor of the car (as shown in dotted lines at the left of Fig. 1) and onto a suitable platform standing level with the said floor and adjacent thereto so that the car floor may be bridged over to the platform. The said plates 8 are provided with bolt holes 10 and also bolt holes 11, the latter being for the purpose of securing the plates within the recesses by bolts extending into the floor of the car, and the former for the purpose of receiving bolts passing through corresponding holes 12 in the floor of the car when the plates 8 are moved outwardly. Pins 13 are provided to extend over the plates 8 to more securely hold them in operative position.

The turn-table has a floor 14 parallel to and positioned above the floor 1, and it is provided with grooves such as 15 and 16 for the purpose of receiving rods or locking bars 17 and 18, these grooves being deep enough to allow the lowering of said rods below the level of the floor of the turn-table so as to be out of the way. Corresponding with these grooves are slots 19 and 20 which may be provided in the sides of the car as shown in Fig. 2, and the locking bars 17 and 18 are adapted to travel in the slots. The locking bars are connected by a locking band 21 so that when the locking bar 17 is suitably rotated it will cause the locking band to tighten around a vehicle wheel 22 to hold it firmly in place against the floor of the car. A number of such slots and locking bars may be provided in the car to accommodate any desired number of vehicles. The above described L-shaped slots may be covered on the outside of the car by plates 23 of corresponding shape, the portions 24 thereof being attached directly against the side of the car, and the surface 25 which constitutes a recess is for the purpose of receiving the head of the locking bar. A slot 26 is for the purpose of receiving the end portion of the bar itself. These L-shaped plates may also be mounted in a similar way on the inside of the car, in which case no slots would be cut through the walls of the car.

The locking bars 17 and 18 may be rods of any suitable character provided with round heads which fit within the recesses 25, and they are more fully shown in Fig. 4. As there shown they are square in cross section except at the ends 27 which are round. Upon the main portion of the rod are mounted collars 28 which may be provided with additional metallic bands 29 circular in form for the purpose of reducing friction when in contact with the wheels of the vehicles. The collars 28 are movable along the locking bar 17 so as to correspond with the tread of the vehicle.

The locking bands 21 may be made of any suitable material such as canvas or other fabric, rubber, leather, wood, iron, chain, rope, or a combination of any of these.

The means for rotating the locking bars are illustrated in a detailed view shown in Fig. 5. The bar 17 has provided thereon at the outside of the turn-table a ratchet wheel 30 cooperating with a pawl 31 fixed upon a vertical sliding plate 32 mounted in guideways or slides 33 and 34 formed by bent-over portions of an exterior plate 35 fastened to the outside of the turn-table. The latter plate has cut therein a vertical slot 36 corresponding to the vertical slot 19 in the side of the car. A crank 37 is fixed to the end of the bar 17 for rotating it, and it will be seen that as the latter is rotated it will move upwardly with plate 32 due to the resistance encountered by the bands 21 on the vehicle wheels. The ratchet and pawl arrangement prevents any undesired backward motion. The bars such as 18 are not provided with this turning means, as it would be unnecessary. The same arrangement would be provided for each set of locking bars and bands. Not only may the L-shaped plates be mounted on the inside of the car, but the ratchet wheel 30 with pawl 31, vertical sliding plate 32, and guideways 33 and 34 may also be mounted on the inside of the car.

Both ends 38 of the car are hinged to the floor thereof so that they may be let down for the purpose of rolling the vehicles to or from an adjoining car or platform suitably stationed to receive the vehicle. Catches 39 serve to hold these ends 38 in place.

The turn-table may be provided with suitable means for locking it in alinement with the lower floor 1, and such means may be a vertical locking bolt passing through holes in the floor 1 and floor 14.

The above described embodiment of a freight car illustrates an arrangement whereby various vehicles such as automobiles may be quickly loaded and unloaded from freight cars onto an adjacent receiving platform, and all of the freight cars may be unloaded simultaneously by reason of the fact that each car constitutes a turn-table which can be turned into the position desired and vehicles unloaded therefrom without waiting for the unloading of another freight car. The turn-table may be turned at right angles to the track, or it may be turned at any other angle in case there is not enough room for unloading. Thus where the space between railroad tracks is small, it would be only necessary to turn the turn-table through a smaller angle than a right angle so that the vehicles could be delivered into a platform positioned between the tracks. In this case the pivot pins may be located near the end of the turn-table instead of near the center as shown in the above embodiment. The floor 14 of the turn-table 2 may be as long as the floor 1, or it may be longer or shorter as desired, and in either event it will be understood that the body of the freight car is built upon the floor 14 of the turn-table so that the entire car may be revolved above the floor 1 which is mounted on the running gear and girders.

The floor 1 may be omitted and the turn-table may be mounted on the girders and supported by tracks or equivalent devices mounted thereon.

Other bridging means may be employed to hold the car in alinement with the receiving platform, for example a long plate semi-circular in form may be hinged to the I-beams or the floor 1 and when not in use may be suitably fastened up against the side of the main car for the purpose of getting it out of the way and of securely locking the main car in alinement with the running gear. Another bridging means would consist in continuations, by means of hinges, of the outer tracks 5, and such extensions, when not in use may be fastened upright against the side of the car and in that position form an additional locking means for holding the turn-table in alinement with the running gear.

The vehicles which may be shipped in such cars as above described may vary in size, for example they may be 10, 15, or 20 feet long, and the means for holding them to the cars would of course vary with the changes in size. Any kind of vehicle or container mounted on wheels may be shipped in the above described manner.

As many apparently widely different embodiments of this invention may be made without departing from the spirit thereof, it is to be understood that I do not intend to limit myself to the specific embodiment thereof except as indicated in the appended claims.

I claim:

1. In a freight car having a floor, a turn-table mounted for rotation above the floor, and bridging means to hold the car floor in a plane with an adjacent receiving platform.

2. A freight car comprising a main rotatable body and running gear, a pivot pin mounted on the running gear, means to support the body while rotating and at rest comprising tracks mounted above the girders between the running gear, and wheels on the car body in engagement with said tracks and bridging means to hold the car level with an adjacent receiving platform.

3. A freight car having a rotatable body and running gear, and means to support the body while rotating and at rest, said car body having ends which may be let down to facilitate the speedy removal of vehicles within the car onto an adjacent platform.

4. A freight car having a rotatable body and running gear, and means to support the body while rotating and at rest, said car having means to securely hold vehicles against movement within the car, and the plates secured below the body for engagement with an adjacent receiving platform.

5. A freight car having a rotatable body and running gear, means to support it while rotating and at rest, and means to hold the car level with an adjacent receiving platform.

6. A freight car having a rotatable body and running gear, means to support it while rotating and at rest, means to hold the car level with an adjacent receiving platform, and means to hold the car in alinement with the running gear.

In testimony that I claim the foregoing, I have hereunto set my hand this first day of July, 1922.

CHARLES FOWLER.